United States Patent [19]

Baucke et al.

[11] Patent Number: 5,509,951
[45] Date of Patent: Apr. 23, 1996

[54] PROCESS FOR FINING OXIDE MELTS

[75] Inventors: Friedrich G. K. Baucke; Thomas Pfeiffer, Mainz, both of Germany

[73] Assignee: Schott Glaswerke, Mainz, Germany

[21] Appl. No.: 27,530

[22] Filed: Mar. 8, 1993

[30] Foreign Application Priority Data

Mar. 6, 1992 [DE] Germany .................... 42 07 059.7

[51] Int. Cl.⁶ .................................................. C03B 5/225
[52] U.S. Cl. ................................. 65/134.6; 65/134.9
[58] Field of Search ............................ 65/134, 135, 136, 65/134.6, 134.9

[56] References Cited

U.S. PATENT DOCUMENTS

| | | | |
|---|---|---|---|
| 1,827,471 | 12/1928 | Hinter | 65/335 |
| 1,970,112 | 8/1932 | Wadman | 65/335 |
| 2,773,111 | 12/1959 | Arbeit | 65/136 |
| 3,530,221 | 9/1970 | Penberthy. | |
| 3,775,081 | 11/1973 | Williams et al. | 65/134 |
| 3,811,858 | 5/1974 | Ernsberger et al. | 65/135 |
| 3,811,859 | 5/1974 | Ernsberger | 65/135 |
| 3,811,860 | 5/1974 | Nier | 65/135 |
| 3,888,650 | 6/1975 | Gell | 65/135 |

FOREIGN PATENT DOCUMENTS 1128561  9/1968  United Kingdom .

OTHER PUBLICATIONS

G. B. Rothenberg, *Glass Technology: Recent Developments*, Noyes Data Corporation: Park Ridge, New Jersey, 1976, pp. 11–15.

Baucke et al., "Measurement of Standard Seebeck Coefficients in Non–Isothermal Glass Melts by Means or $ZrO_2$ Electrodes," *Journal of Non-Crystalline Solids* 84 (1986) 174–182.

Jebsen–Marwedel et al. (ed.), *Glastechnische Fabrikation*, Springer–Verlag: Berlin, 1980, pp. 295–239.

*Primary Examiner*—John M. Hoffmann
*Attorney, Agent, or Firm*—Millen, White, Zelano, & Branigan

[57] ABSTRACT

In a process for fining oxide melts, comprising fining an oxide melt with gas generated electrochemically in situ in the oxide melt, oxygen is generated in situ electrolytically as the fining gas. Alternating, as well as direct, voltage may be employed.

12 Claims, 1 Drawing Sheet

PROCESS FOR FINING OXIDE MELTS

BACKGROUND OF THE INVENTION

The invention relates to a process for fining oxide melts, particularly glass melts.

In relation to melts, fining is understood to mean the removal of gas bubbles from the melt. In order to achieve maximum freedom from unwanted gases and bubbles, thorough mixing and degassing of the molten mixture, for example, the glass, is required.

The behavior of gases and bubbles in a glass melt and the removal thereof is described, for example, in H. Jebsen-Marwedel and R. Brückner, "Glastechnische Fabrikationsfehler," Third Edition, Springer-Verlag, p. 195 ff., as well as in Uhlman and Kneidl, eds., "Glass Science Technology," Vol. 2, Chapter I, Michael Cable, pp. 16–24.

Generally speaking, in principle, two different fining processes are known, which differ essentially by the nature and manner of fining gas generation.

In mechanical fining, water vapour, oxygen, nitrogen or simply air are forced in through openings in the bottom of the melting unit. In this so-called bubbling process, the melt then becomes thinner as a result of a further increase in temperature, and the gas bubbles can rise more easily to the surface. This stage of the process is also known as "bubble removal". In the bubbling process, freedom from unwanted gases is often improved by agitators. As the bubble size of the fining gases forced in is generally too large, however, and the gas bubbles rise too quickly, the extremely high degrees of freedom from unwanted gases required for melting optical glasses, for example, are achieved only with great difficulty, even by agitator support.

Chemical fining processes are used most frequently. Their principle lies in the fact that compounds that decompose and dissociate gases, or compounds that are volatile at relatively high temperatures, or compounds that liberate gases in an equilibrium reaction at relatively high temperatures are added to the melt.

Sodium sulphate (Glauber's salt), for example, belongs to the first group of compounds, which cleaves sulphur dioxide and oxygen at about 1,200° C. and is preferred as a cheap raw material for fining mass-produced glasses.

The compounds that are volatile at high temperatures because of their vapour pressure and are effective as a result include, inter alia, NaCl or certain fluorides.

Finally, the last group of substances includes the so-called redox fining agents such as, for example, arsenic oxide, antimony oxide or cerium oxide etc. In this by far the most frequently used process in practice, polyvalent ions which may occur in at least two oxidation states are used as redox fining agents, which ions are in a temperature-dependent equilibrium with one another, a gas, mostly oxygen, being liberated at high temperatures.

The redox equilibrium of the substance dissolved in the melt can be represented by the equation (I), taking arsenic oxide as an example $$As_2O_5 = As_2O_3 + O_2\uparrow \quad (I)$$

The equilibrium constant K for (I) may be formulated as in equation (II):

$$K(T) = \frac{{}^a As_2O_3 \cdot {}^P O_2}{{}^a As_2O_5} \quad (II)$$

In this equation, ${}^\alpha As_2O_3$ and ${}^\alpha As_2O_5$ mean the activities of arsenic trioxide and arsenic pentoxide, and ${}^P O_2$ means the fugacity of the oxygen.

The equilibrium constant K is highly temperature-dependent, and a defined oxygen fugacity ${}^P O_2$ can be adjusted by means of the temperature and the activities of the oxidic arsenic compounds.

Both in mechanical and chemical fining, essentially three fining effects may be distinguished:

1) a primary fining effect due to the spontaneous formation or introduction of gas bubbles, preferably oxygen bubbles, during the use of redox fining agents, whereby the unwanted gases dissolved in the melt, for example $CO_2$, $N_2$, $H_2O$, NO, $NO_2$ and others, diffuse into the gas bubbles. The gas bubbles thereby become inflated, and the inflated gas bubbles rise upwards more quickly, eventually leaving the melt;

2) a secondary fining effect in which the reverse process to the one described under 1) takes place, namely the diffusion of gases, for example oxygen, out of the redox equilibrium into unwanted gas bubbles present, so that said bubbles become inflated and receive an increased uplift and 3) a so-called resorption effect in which inflated bubbles of, for example, oxygen, produced according to 1) or 2) and still present in the melt when the temperature is reduced dissolve, for example, in the case of the redox equilibrium (I) as a result of the equilibrium being shifted to the side of the starting product.

A common feature of all chemical fining processes is that chemicals which are harmful to the environment, but at least not environmentally acceptable, are added to the melts. In addition, volatilisation fining agents, fluorides, may be mentioned for example, or arsenic or antimony oxides which act as redox fining agents. Already, certain substances can be used only on a very restricted scale now (fluorides, arsenic oxide) or in the near future (antimony oxide), and there are plans to prohibit their use altogether. Alternative redox fining agents, for example, cerium oxides, are relatively expensive substitutes.

Apart from mechanical and chemical fining, there have also been attempts to fine oxide melts by electrochemical means.

A process for fining oxide glass melts is known, for example, from U.S. Pat. No. 3,775,081, in which the fining gas is generated in situ in the oxide melt in an electrochemical reaction. To this end, small quantities of molten metal are required on the bottom of a melting vessel in order to generate hydrogen gas in an electrochemical reaction from water vapour which is present in the glass melt or has diffused therein, which gas is claimed to serve as a fining gas for fining the melt.

The process described in U.S. Pat. No. 3,775,081 is, however, associated in various ways with considerable disadvantages. The process is restricted to gas-heated melting tanks, since water vapour can be made available in such quantity as is sufficient to generate the hydrogen fining gas only in tanks heated with gas or oil, but not in electrically heated melting tanks. The presence of a source of water vapour in the melt to be fined—whether the water vapour results from burning fuel or, another possibility, whether it is introduced—is extremely disadvantageous in this connection because the melt must, in principle, be kept free from water vapour for effective fining in order to avoid the "reboil effect" of the melt.

In addition, with the process according to U.S. Pat. No. 3,775,081 there is the risk that concentrations of metal ions of polyvalent metals other than the desired concentrations will be obtained in the glass produced. This may be the consequence of a varying partial pressure of water vapour becoming lower during the course of fining, which leads to a shift in the redox equilibrium of polyvalent ions, such as the reduction of $Fe^{2+}$ to $Fe^{3+}$. Moreover, the requirement that the metal for reducing the water vapour in the process according to U.S. Pat. No. 3,775,081 must be present in the molten state in order to achieve a sufficient reactivity of the metal restricts the process—depending on the glass melt—to tin, lead, antimony or nickel as metal. The converse conclusion is, therefore, that not every glass melt can be fined in this way. Moreover, a whole series of glasses is excluded a priori from the use of the fining process of U.S. Pat. No. 3,775,081, however, because there is a risk that the glass components will be reduced by the molten metal. The greatest disadvantage, however, is likely to lie in the use of hydrogen as fining gas. The gaseous hydrogen may react immediately with oxygen in an explosive manner on leaving the melt.

Apart from electrochemical fining, in which gas bubbles are generated in the glass melt for the refining thereof, it is also known, for example, from GB-A-1,128,561, that the formation of gas bubbles produced by electrochemical reactions can be prevented in glass melts that have already been fined. In this connection, GB-A-1,128,561 advocates keeping a glass melt in an electrically conducting tank under a non-oxidising atmosphere in order to avoid the renewed occurrence of gas bubbles after fining.

Although GB-A-1,128,561 describes a principle according to which the development of gas bubbles in the melt appears to be explainable, the conclusions with regard to fining are incorrect or wholly absent. In GB-A-1,128,561, a so-called platinum/glass ($T_1$)-glass ($T_2$)/platinum thermocell is described, the short circuit of which leads to oxygen bubble formation in the "reboil effect". Contrary to the stated principle, however, oxygen formation may occur not only at the higher temperature electrode but also at the lower temperature electrode (Baucke, Mücke in Journal of Non-Crystalline Solids 84 (1986), page 174 ff). Moreover, the stated principle has another error. This consists in that the development of oxygen at the higher temperature electrode does not yet lead to bubble formation that can be used for fining, only to oxygen formation. In order to form bubbles from oxygen that can be used for fining, the higher temperature must lie in the vicinity of the reboil temperature.

Moreover, no indication can be derived from the entire prior art concerning electrochemical fining processes as to how the kinetics of the fining reaction are to be controlled, or how the thermodynamics of the fining reaction can be mastered and used in a purposeful manner. In other words, no method is shown as to how the number of bubbles and the size of the fining gas bubbles could be adjusted.

SUMMARY OF THE INVENTION

In comparison with the prior art described, the object of the invention is to provide a process for fining oxide melts which makes it possible to obtain melts with a high degree of freedom from unwanted gases and at the same time to dispense with the use of environmentally harmful fining chemicals, but at least markedly to limit the use thereof. At the same time, the new process should be simple and cheap to carry out.

In particular, the disadvantages of the electrochemical fining process with hydrogen generated in situ should be avoided, whereby an electrochemical fining process should be specified with which both the kinetics and the thermodynamics of fining gas development can be controlled.

Said object according to the invention is achieved in that a process for fining oxide melts is provided in which the fining gas is generated electrochemically in situ in the oxide melt, the process being characterised in that oxygen is generated electrolytically as fining gas.

Advantageous process modifications are the subject of the dependent patent claims.

The advantages of an electrochemical fining process consist essentially in that, in contrast to mechanical fining, the melting units do not have to be prepared specially for forcing in gases and in that the bubble size of the fining gas is easily adjustable. In contrast to the chemical fining method, particularly the redox fining method which had hitherto become established in practice, it is possible to dispense with the use of toxic or expensive redox chemicals, or the amount thereof can be markedly reduced.

In the fining process according to the invention for oxide melts, particularly glass melts, at least two electrodes are provided which are both in contact at least partially with the oxide melt, for example, dip into the oxide melt and which are connected to each other by means of a power source so that, when a voltage is applied to one of the two electrodes, fining gas develops in the form of bubbles so that gaseous unwanted substances that are trapped in the melt are removed from the melt according to the primary and/or secondary fining effect described above.

The gas bubbles required to bring about the primary and secondary fining effect are, therefore, developed by electrolysis of the oxide melt at a fining electrode. In this process, oxygen develops in an electrochemical reaction according to equation (III).

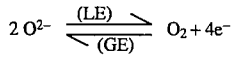

$$2 O^{2-} \underset{(GE)}{\overset{(LE)}{\rightleftharpoons}} O_2 + 4e^-$$

In equation (III), (LE) stands for refining electrode and (GE) for counter-electrode. As the process according to equation (III) is a reaction in which cathodic and anodic reaction have the same current intensity, the counter-electrode (GE) is installed preferably in a place in the melt that allows the presence of oxygen in the elemental gaseous form or the elemental dissolved form. In the case of oxide melts, this is preferably in the vicinity of the melt surface which is in contact with the atmosphere above the melt, in which case steps should be taken to ensure a sufficient oxygen content in the atmosphere above the melt.

It should be stated in this connection that preferably oxygen is suitable for the electrochemical fining process described hitherto because both the melts and the atmosphere above the melt in the melting unit have sufficiently high activities or concentrations of $O^{2-}$ ions or molecular oxygen in the dissolved or gaseous form. The use of other gases is, however, equally possible, but a sufficiently high activity of ions of said gas must be present in the melt, and the atmosphere outside the melt must have a sufficient concentration of said gaseous substance. Nevertheless, fining gas should usually be understood hereinafter to mean oxygen.

The fining electrode is provided preferably completely inside the oxide melt, whilst the counter-electrode, as explained already, dips partially into the oxide melt and is partially in contact with the atmosphere above the oxide melt, or is provided in the melt but near the melt surface.

In order to keep the oxygen bubbles developed at the fining electrode in contact for as long as possible with the melt and the unwanted gases for the diffusion of the unwanted gases into the $O_2$ bubbles and for diffusion for the unwanted gases, it is advisable to provide the fining electrode on the bottom of the melting unit, if possible, for example, on the bottom of the tank. It is also possible, inter alia, to construct the fining electrode as an integral component of the tank bottom or to design the tank bottom itself as the refining electrode.

The counter-electrode may also be provided in a separate melting unit. In order to carry out the process of the invention, it is merely necessary that the counter-electrode be in conductive connection with the fining electrode. This is done, for example, by means of connections, suitable connecting wires or lines. Of course, it is also necessary in such a case that the melt in the separate melting unit be likewise in contact with the melt to be fined, for example, by means of a channel etc. By means of such an arrangement, however, advantageous thermostatting and also control of the atmosphere and improved conditioning of the counter-electrode is possible.

In order to bring about the reaction according to equation (III), it is necessary to apply a voltage to the electrodes in conductive connection with one another. If a direct voltage is applied, the fining electrode is the anode, that is, to be connected to the positive pole and the counter-electrode is the cathode, that is, to be connected as the negative pole. When the direct voltage U of suitable magnitude is switched on, oxygen bubbles develop at the fining electrode according to the reaction of equation (III), the size of which bubbles depends on the voltage applied. It is thus quite possible to generate very small microbubbles to large bubbles, depending on the condition and the requirements of the melt to be refined.

Surprisingly, it has emerged, however, that an alternating voltage may also be used for fining. In this case, it is no longer possible to speak of anode or cathode, rather, the fining electrode is now the one at which the current density is greater. Current density is generally understood to mean the current per unit area. It is a measure of the rate at which ions can be discharged at electrodes. The fining electrode must, therefore, have a smaller surface area than the counter-electrode when an alternating voltage is applied, unless other parameters affecting the current density predominate or are even critical.

Apart from direct voltage and alternating voltage, superimpositions thereof are also suitable as voltages, indeed, alternating voltage or superimposition of direct and alternating voltage are even advantageous because they offer greater protection against unwanted cathodic functions. The voltage is preferably adjustable, for example by means of a resistor.

In all cases, however, the amount and bubble size of the oxygen evolved at the fining electrode can be controlled and adjusted by means of certain parameters. Oxygen evolution depends, inter alia, on the type of voltage applied, the size and frequency of the voltage, the current density, the temperature and the composition of the melt etc. Taking these factors into account, however, all special systems can be optimised in a few tests by the man skilled in the art.

Moreover, the electrochemical fining process within the meaning of the invention may also be controlled electronically and, in particular, computer-controlled. Allowing for certain input values which may include, for example, melt composition, temperature of the melt or unwanted gas content of the melt, the above-mentioned parameters such as voltage and current density can be optimally adjusted.

At all events, it is generally necessary to make sure that the counter-electrode can come into contact with sufficient quantities of oxygen. If not enough oxygen is available, the melt will be electrolysed and silicon, for example, or other components of the melt will be precipitated onto the electrodes, which may lead to the ineffectiveness or destruction thereof. If all the parameters are coordinated, however, electrochemical refining permits so to speak an electrochemical pumping of oxygen from the atmosphere or of dissolved oxygen at the counter-electrode to oxygen in bubble form at the fining electrode.

The special embodiments of the electrodes that may be used are usually known to one of ordinary skill in the art. All substances that are, if possible, inert towards aggressive media and high temperatures have proved suitable as materials. These are, amongst others, noble metals such as platinum, noble metal alloys such as platinum-rhodium or platinum-iridium, conductive ceramics (not ionic, but electron-conducting or hole-conducting), $SnO_2$ ceramics, for example, in a tubular arrangement.

Using the electrochemical fining process according to the invention, it is possible to produce a very high degree of freedom from unwanted gases in the melt which is sufficient for most purposes. If it is necessary to increase further the freedom of the melt from unwanted gases, it is preferable to add to the melt about $1/10$ of the quantity of a redox fining agent, the statement of quantity referring to the quantity of redox fining agent normally added to fine the melt without electrochemical fining. The resorption of the last residues of fining gas or residual fining bubbles is also thereby achieved. Of course, combinations of the electrochemical fining process according to the invention with other known fining processes are also possible.

BRIEF DESCRIPTION OF THE DRAWINGS

The figure is a schematic illustration of a system for carrying out the process of the invention.

The figure shows a diagrammatic representation of a melt 10 in a melting unit 20, for example, a tank, which is only suggested. One electrode, the fining electrode 30, is provided in the melt on the bottom of the tank 20, whereas the second electrode, the counter-electrode 40, is situated near the surface of the melt. Counter-electrode 40 and fining electrode 30 are linked together by means of a line 50, a power source 60 and an adjustable resistor 70. When a voltage is applied and the voltage and frequency adjusted, gas bubbles in the desired yield and size develop at the fining electrode with the smaller surface area so that fining of the melt is achieved. At the counter-electrode 40, molecular dissolved or free oxygen is converted to $O^{2-}$ ions according to the reverse reaction of equation (III).

Figure 1:
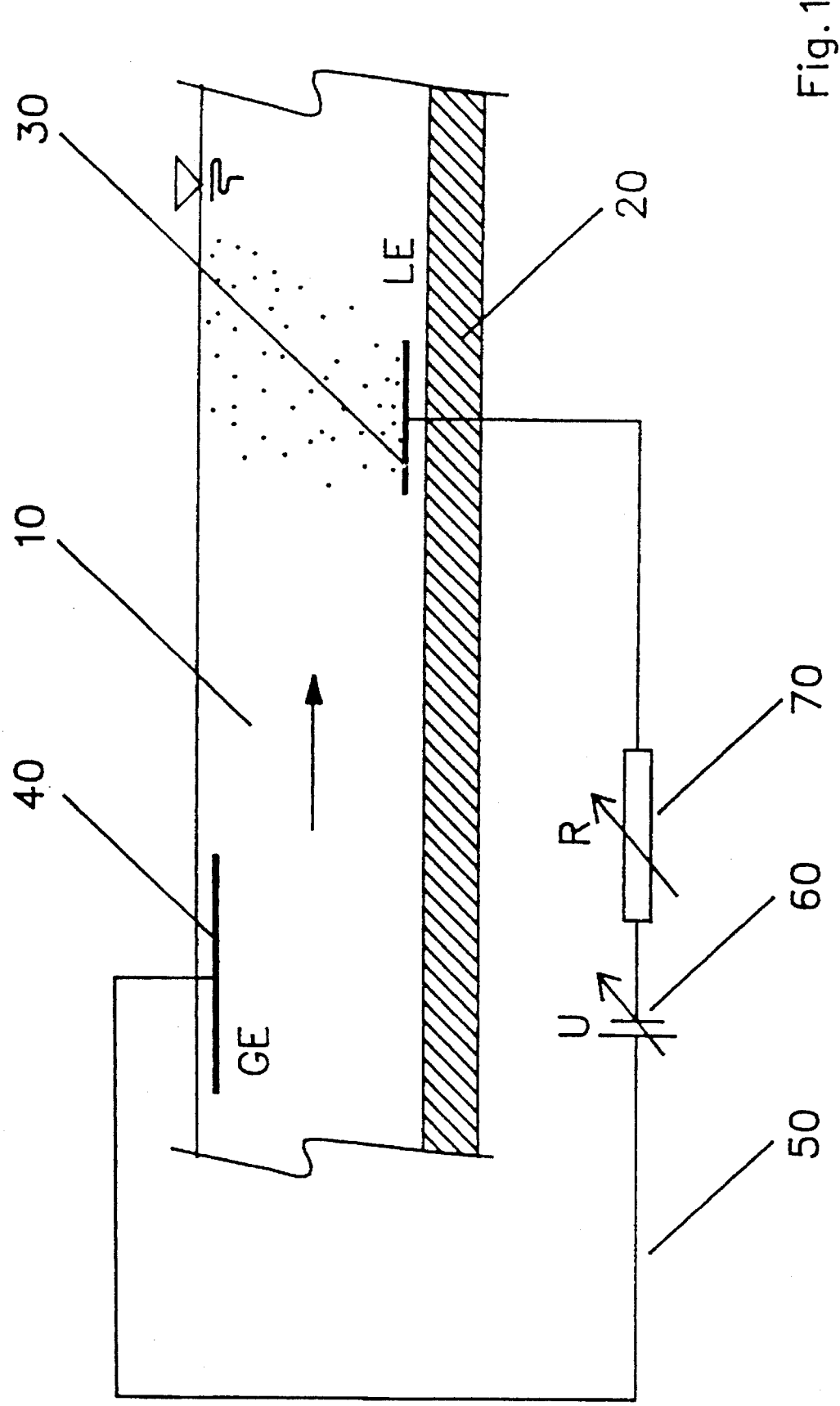

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application P 42 07 059.7-45, filed Mar. 6, 1992, are hereby incorporated by reference.

Example A

In a Pt/10 Rh pot as vessel, which had a capacity of 2 l and could be heated inductively with 10 kHz, a glass was melted from the sodium-calcium-silicate system which had, for instance, a composition customary for window glasses.

The glass composition contained traces of fining agents and was not fully fined, so that it had residual contents of $CO_2$, $N_2$ and $H_2O$. The temperature of the melt was about 1300° C. A mesh situated in the glass melt and composed of Pt/10 Rh which had a fining electrode surface area of about 20 $cm^2$ served as fining electrode. A relatively large Pt/10 Rh surface area near the surface of the melt in the pot served as counter-electrode.

The fining electrode was connected anodically whereas the counter-electrode was connected cathodically. A direct voltage of 150 mV was applied to the electrodes as operating voltage, the voltage at the fining electrode being 150 mA. When the voltage was applied, oxygen bubbles formed at the fining electrode which had an average size of about 0.05 mm on leaving the electrode. The formation of the oxygen bubbles was observed optically by means of a television camera and screen. Under the fining conditions mentioned, about 2 bubbles per second were formed, the bubbles growing while moving upwards in the melt, i.e., their volume increasing. The uplift time in the melt for one bubble was about 2 hours. The analysis of the bubbles after rising gave a content per bubble of a maximum of 50% $CO_2$ and 30% $N_2$ at the beginning of electrolytic fining, these proportions decreasing as fining of the glass melt progressed.

It could thus be shown with this test carried out on a laboratory scale that glass melts may be fined electrochemically by means of direct voltage. In the pot test the melt was stationary, in contrast to the flowing melts present on an industrial scale, but the results can be transferred by one of ordinary skill in the art to the conditions of flowing melts, in which a part of the oxygen evolved at the electrode is removed without participating in bubble formation.

Example B

In an assembly of the apparatus similar to Example A, a glass melt the same as in Example A was fined by applying an alternating voltage of 1 V and 5 to the electrodes as operating voltage. A direct voltage of 100 mV is then produced in the case of alternating current. The alternating current at the fining electrode was eventually 20 A, a direct current of +200 mA being produced.

Except for the differences in the numerical values of voltage and current, the fining results were identical.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. In a process for fining oxide melts, comprising applying an electric voltage to a fining electrode and a counterelectrode, immersing the fining electrode completely in the oxide melt so as to electrolytically generate oxygen in situ as a fining gas for the removal of unwanted gases from the oxide melt, the improvement comprising contacting the counterelectrode with the oxide melt and with sufficient $O_2$ dissolved in said oxide melt to prevent precipitation by electrolysis of components of said oxide melt onto said counterelectrode wherein the counterelectrode is immersed near the surface of said oxide melt where there is sufficient dissolved $O_2$ to prevent said precipitation by electrolysis of components of said oxide melt onto said counterelectrode.

2. A process according to claim 1, comprising applying direct voltage to the electrodes, the fining electrode being in contact with the positive pole, and the counter-electrode being in contact with a negative pole of a power source.

3. A process according to claim 2, wherein the voltage applied to both electrodes is adjustable.

4. A process according to claim 2, further comprising adjusting the size of the oxygen bubbles by adjusting the voltage using an adjustable resistor.

5. A process according to claim 1, wherein said voltage applied to said fining electrode and counterelectrode is an alternating voltage whereby a greater current density is achieved at said fining electrode than at said counterelectrode.

6. A process according to claim 5, further comprising superimposing a direct voltage over said alternating voltage.

7. A process according to claim 5, further comprising adjusting the rate of oxygen generation by altering frequency, voltage, current density or combinations thereof.

8. A process according to claim 5, wherein the fining electrode has a smaller electrode surface area than the counterelectrode.

9. A process according to claim 1, wherein the atmosphere above the oxide melt contains sufficient oxygen to provide dissolved $O_2$ within the melt and thereby prevent said precipitation by electrolysis of components of said melt onto the counterelectrode.

10. A process according to claim 1, further comprising adding a redox fining agent to the melt for resorption of residual bubbles.

11. A process according to claim 1, wherein the electrodes are made from a material selected from the group consisting of platinum-iridium alloy, platinum-rhodium alloy, and non-ionic conducting ceramics.

12. In a process for fining oxide melts, comprising applying an electric voltage to a fining electrode and a counterelectrode, immersing the fining electrode completely in the oxide melt so as to electrolytically generate oxygen in situ as a fining gas for the removal of unwanted gases from the oxide melt, the improvement comprising contacting the counterelectrode with the oxide melt and with sufficient $O_2$ dissolved in said oxide melt to prevent precipitation by electrolysis of components of said melt onto the counterelectrode wherein the counterelectrode is immersed near the surface of the melt where there is sufficient dissolved $O_2$ to prevent said precipitation by electrolysis of components of said melt onto said counterelectrode, wherein $O_2$ dissolved in said glass melt is converted at said counterelectrode to $O^{2-}$ ions according to the reaction of the following equation:

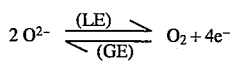

wherein

LE stands for refining electrode, and

GE stands for counterelectrode.